July 1, 1969     L. J. DOLAN     3,453,628

BROADBAND VIBRATION-SUPPRESSED AIRCRAFT BLADE ANTENNA

Filed Nov. 22, 1966     Sheet 1 of 2

INVENTOR.
LEO J. DOLAN
BY
Thomson & Mrose
ATTORNEYS

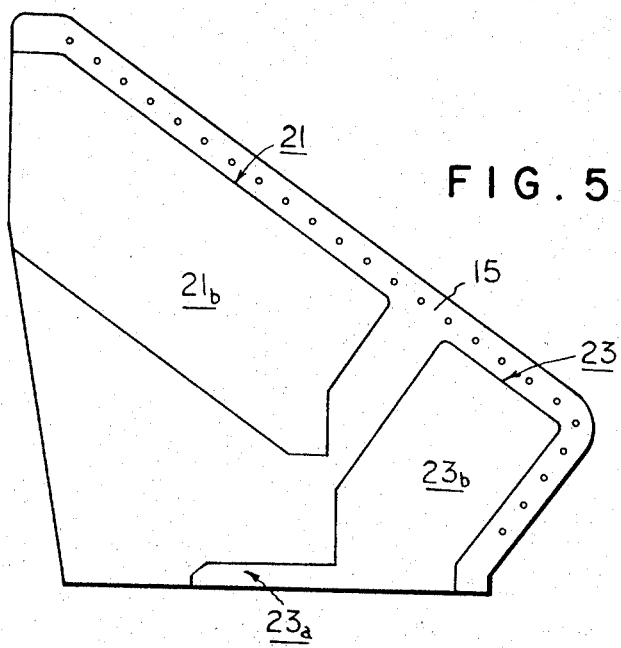
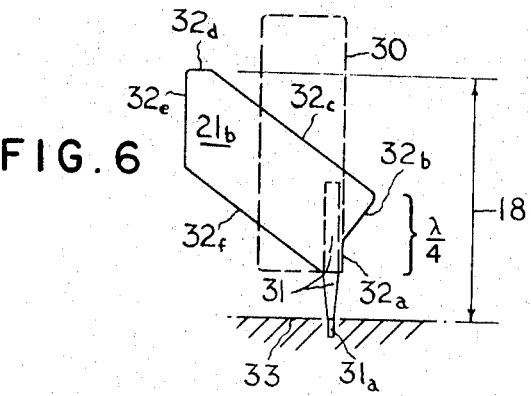
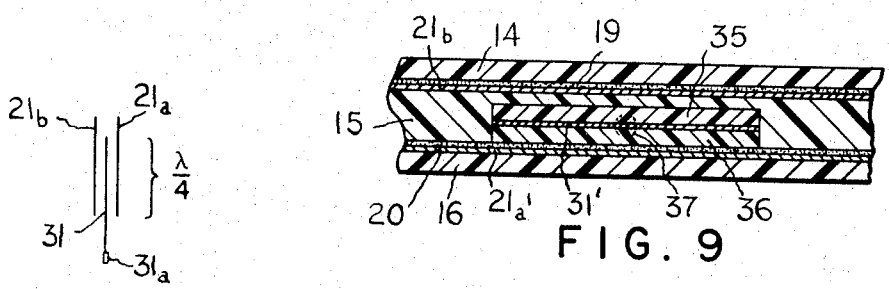

United States Patent Office 3,453,628
Patented July 1, 1969

3,453,628
BROADBAND VIBRATION-SUPPRESSED AIRCRAFT BLADE ANTENNA
Leo J. Dolan, Arlington, Mass., assignor to Adams-Russell Co., Inc., Waltham, Mass., a corporation of Massachusetts
Filed Nov. 22, 1966, Ser. No. 596,171
Int. Cl. H01q 1/28
U.S. Cl. 343—708      15 Claims The present invention relates to improvements of physical and electrical operating characteristics of antennas intended for mounting on aircraft or the like, and, in one particular aspect, to broadband blade antennas having highly favorable aerodynamic characteristics while functioning efficiently and with advantageous omnidirectionality over wide ranges of frequencies and while dissipating troublesome failure-inducing energies of shock and vibration.

Environmental conditions of flight are severe even in those instances permitting installation of equipment within the confines of an aircraft structure; such problems are of course vastly magnified and extended when the installation necessarily entails projection of elements beyond the craft skin, as in the case of antennas which must operate outside of shielding material. The use of protective insulating domes is not always feasible, notwithstanding willingness to accept attendant costs and aerodynamic complications, and it then becomes highly important that the antennas be independently capable not only of satisfying very demanding electrical requirement but of resisting mechanical failures due to extremes of environmental punishment.

In accordance with teachings of the present invention, antennas which overcome difficulties of the aforesaid character are embodied in thin flat structure involving substantially coplanar broad-area conductive antenna elements, at least one of which functions as a parasitic element and another of which departs from the usual blade configuration in that it has an advantageous unique swept-back configuration which permits reduction of its overall height below levels heretofore permissible in such broadband devices. These elements are in a thin laminated streamlined assembly with flat fiber glass members having a shear-responsive damping medium between and coextensive with them, the damping medium layers preferably comprising a known thin substantially permanently viscous and adhesive material which is both substantially transparent to electromagnetic energy and conducts heat well. Delamination is counteracted by spaced metallic edge fasteners which remain essentially invisible, electrically, and the thin laminated blade is supported on edge, perpendicular to the craft skin, by a mount also including laminated self-damped members and a flat strip coupling which conveniently lends itself to desirable use in the laminated damped array.

It is one of the objects of this invention, therefore, to provide novel and improved craft-mounted antennas of a swept-back blade configuration offering broadband characteristics in low-height structure which minimized interactions with the ambient environment.

Another object is to provide unique and advantageous blade-type antennas of laminated construction which inherently dampen the potentially-destructive energies of shock and vibration.

A further object is to provide a vibration-suppressed somewhat flexible aircraft antenna including flat conductive elements sandwiched between flexible insulating members by way of permanently-viscous insulating damping material.

Still further, it is an object to provide a rugged, light-weight and inexpensive blade-type antenna construction including substantially flat and coplanar elements which yield broadband characteristics and desired directionality patterns in the manner of a half turnstyle through a combination of at least one parasite with a non-symmetrically coupled main element of advantageously swept-back low-height proportions.

By way of a summary account of practice of this invention in one of its aspects, an antenna adapted for mounting in outwardly-projecting and substantially normal relation to the skin of an aircraft is fashioned in the general form of a thin flat blade which is somewhat flexible and substantially triangular in form. The blade comprises three coextensive and somewhat flexible laminations of fiber glass, the inner of which is coated in a predetermined pattern with a thin deposit of copper, on at least one side; between the adjacent laminations, and coextensive with them, is disposed a known substantially permanently-viscous damping material which also has good adhesive tendencies. Rivets further secure the laminations together near the outer periphery of the composite blade. A pair of additional short-height laminations provide reinforcement near the base of the structure, along the lower edge of the composite blade, and are joined with the blade via layers of the same damping material. Nearer what is to be the leading edge of the blade, the copper coating on the inner lamination is shaped to serve as a flat grounded director for a rearwardly-spaced main antenna element, also formed by copper coating. The latter element is of a unique low-height pattern which sweeps back and upwardly; coupling of this element with the associated cabling is achieved by a flat conductive strip member spaced from the coating and incorporated into the laminated structure. Broad bandwidths and spread-out patterns are readily available with such an antenna, and it is found to withstand very severe vibration and to dissipate heat efficiently without failure.

Although the features of this invention which are considered to be novel are expressed in the appended claims, further details as to preferred practices and as to the objects and features thereof may be most readily comprehended through reference to the following description taken in connection with the accompanying drawings, wherein:

FIGURE 1 portrays a preferred, embodiment of an improved broadband blade antenna, in a side view, with portions broken away, cross-sectioned and shown in phantom to reveal constructional details;

Figure 4:
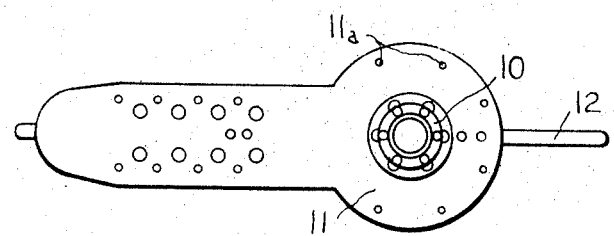

FIGURE 4 views the same assembly from below;

FIGURE 5 illustrates a center lamination of the composite antenna assembly of FIGURES 1–5, with conductive coating patterns of director and main antenna elements;

FIGURE 6 depicts a main antenna element and an associated coupling strip, together with an outline of a conventional antenna element;

FIGURE 7 provides an end view of main antenna elements together with an intermediate coupling strip;

FIGURE 8 is a diagram of electric field vectors for an improved swept-back antenna element like that of FIGURE 6; and FIGURE 9 presents a transversely cross-sectioned fragment of a blade antenna including a flat strip coupling arrangement.

The antenna assembly depicted in FIGURES 1–4 includes at its lower front extremity an electrical connector unit 10 which is designed to mate with a coaxial cable for coupling energy between the antenna and its associated electronic equipment (not shown). A rigid substantially flat mounting base 11 is fixed both with that connector unit, on the under side, and with a unique composite thin antenna blade, 12, on the top side thereof; bolt holes 11a in the base provide for its secure mounting atop the skin of an aircraft at an appropriate location. As is evident from the illustrations, the blade 12 is very thin in relation to its other dimensions, and its swept-back outline is generally triangular, with its apex region intended to face forward (the direction of arrow 13) close to the base. This configuration and orientation are advantageous insofar as drag and structural ability to withstand airstream forces are concerned. Considering its relatively broad area, the thinness of blade 12 would appear to invite mechanical failures, and that would be the case with even the strongest materials which are of practical value in such an application; however, an important aspect of the improved blade antenna resides in its special composite construction which, although theoretically necessarily exhibiting lesser load-carrying strength than a comparable solid member, in fact serves to dissipate enough energy from unwanted sources to inhibit failures which ordinarily could be expected to occur. In this connection, the thin blade is seen (FIGURE 2) to comprise three coextensive laminations 14, 15 and 16, each of which is of a fiber-reinforced electrically-insulating and electromagnetically-transparent material, such as epoxy fiber glass. The center lamination, 15, is made as thick as other design considerations warrant, such that it will impart the major load-carrying strength to the composite structure, while the outer or cover laminations, 14 and 16, are made relatively thin and yet stiff enough to act as non-buckling plates rather than as foil. A typical construction involves a center-lamination thickness 15a of about one-fourth inch and cover-lamination thicknesses 14a and 16a of about one-thirty-second inch, in a blade having an overall length 17 and maximum height 18 each a little over eighteen inches. This proportioning importantly insures that even the center lamination 15 has a certain measure of flexibility under conditions of vibration and shock, and it is as a result of relative slipping between the laminations under flexure conditions that highly beneficial dissipations of unwanted vibration- or shock-induced energy will take place. High levels of energy dissipation are promoted by thin layers 19 and 20 of a substantially permanently viscous medium, these layers being interposed between and substantially coextensive with the adjacent laminations. The medium may advantageously comprise a known silicone-based material, such as oils and adhesives, preferably the latter, having viscosity coefficients between about 500,000 to several million centistokes; these materials possess uniform density, substantially permanently viscous characteristics, and high molecular cohesiveness and adhesiveness to the blade antenna materials with which they are in contact. Alternatively, the thin damping layers may be of other materials offering like characteristics, such as a doubly-coated tape having the damping medium applied to both sides. Shear effects within the damping medium, induced by relative slippage between the laminations under conditions of flexure or the like, are predominant in causing the unwanted energy to be dissipated rather than to find its release by way of mechanical damage to the blade. The medium itself dissipates the resultant heat efficiently, over the relatively large blade area involved.

Electrically, the blade antenna is developed by thin electrically-conductive surfaces of predetermined patterns. The main antenna element, having the outline 21 in FIGURE 1, includes two such conductive elements, 21a and 21b, which are preferably identical and aligned parallel with one another with a small spacing determined principally by the width of the insulating center lamination 15 between them.

Figure 1:
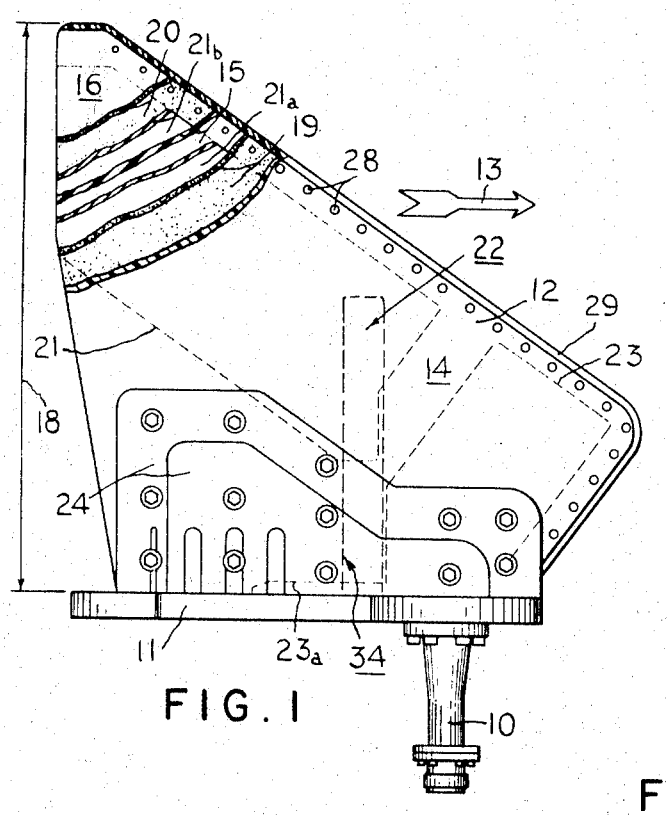
Figure 2:
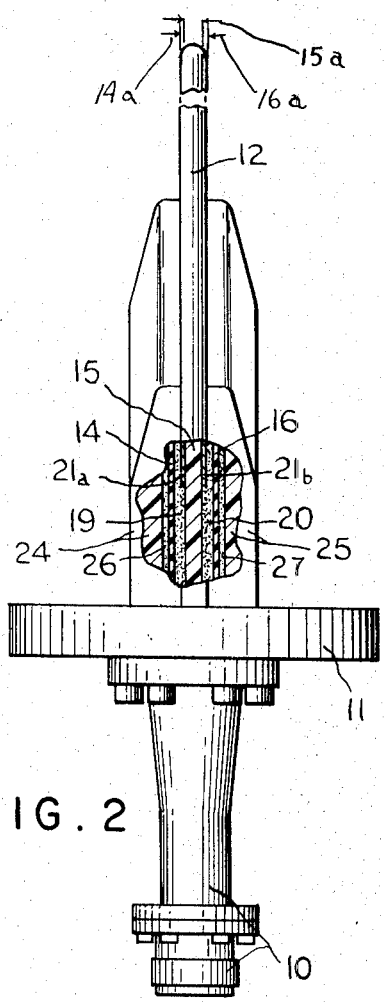
FIGURE 2 is a partly cross-sectioned end view of the same antenna.
Figure 3:
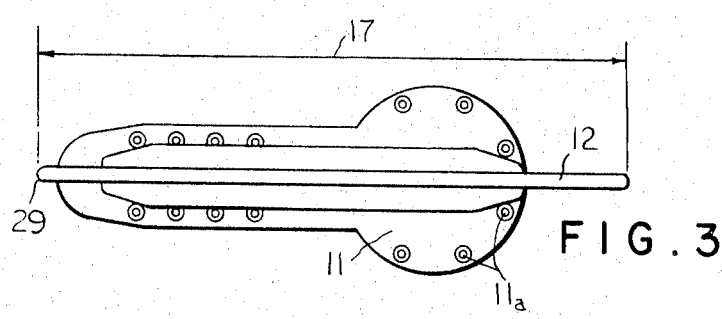
FIGURE 3 represents a plan view of the antenna of FIGURE 1, the sectioning being in enlargement.

As shown in FIGURES 1 and 2, both conductive elements 21a and 21b are on opposite faces of lamination 15, although it can be advantageous instead of have one or both on the inner surfaces of cover laminations 14 and 16. In one practice, the conductive elements comprise direct thin copper cladding on the lamination surfaces, etched to shape, although they may also be made as pre-formed foil or thin plate. Importantly, these elements are each spaced upwardly from the base 11, thus being insulated from it, and they have a swept-back form, rising slightly upwardly and rearwardly from a forward position 22 (FIGURE 1) where a non-symmetrical electrical coupling is established. The latter coupling is conveniently achieved by a flat strip-line element, intermediate the elements 21a and 21b, which is in turn connected with the center conductor of connector 10 via a strip-line section located within the base 11; details of this transition section are not illustrated, inasmuch as they follow known techniques, can be modified in other embodiments, and are not essential to an understanding of the unique features of the present invention. A parasitic element, having the outline 23 in FIGURE 1, is also included, this element being at the forward end of the antenna chosen for illustration, and being grounded to the base (and in turn to the aircraft skin) by a grounding portion 23a. Although this element specifically serves as a director, it may obviously be replaced by or be used in conjunction with a reflector to the rear, and more than one such parasitic element may be involved. The director is likewise a conductive cladding, or foil or plate, and may be applied to one or both sides of the center lamination 15 or to one or both of the inner surfaces of cover laminations 14 and 15. Lower than expected overall height of the antenna is achieved using the swept-back non-symmetrically fed element configuration, and this factor, coupled with the damping of the composite structure, promotes operating success of the antenna as a whole. Structural strength of the blade is preferably augmented near the base 11 by relatively rigid side clamp members 24 and 25, of insulating material such as an epoxy fiberglass; these clamps are contoured as shown both for aerodynamic purposes and to conserve weight and bulk where not essential. Layers 26 and 27 of the aforementioned damping material are also preferably provided between the clamps and the adjacent blade cover laminations, to permit the needed blade flexures and to augment both the damping and heat dissipations. Delamination tendencies are resisted by peripheral rivets 28 at selected locations; such rivets, being small, are essentially "invisible" electromagnetically, and the lamination holes through which they pass may be sufficiently large to accommodate the desired small slippages between the laminations. In addition, the blade periphery may be covered, as by an epoxy coating 29.

FIGURE 5 portrays the center lamination 15 and its conductive coatings 21b and 23b which form the main and director antenna elements, respectively, as the result of application of printed circuitry techniques, including etching to fashion the patterns 21 and 23. Element 21b is represented in relation to the dashed-linework pattern 30 of a more conventional type of antenna blade element, in FIGURE 6, the latter element being generally of greater minimum height for a particular application, and further being more nearly symmetrically fed. In the latter connection, a flat strip coupler 31 is shown to be disposed in a highly non-symmetrical relation to the element 21b, and to its like companion element 21a (FIGURE 7), near the forward end thereof, the elements and coupler being mated over about a quarter wavelength distance, in relation to the optimum or median frequency within a preferred range. Lower end 31a of the upstanding strip coupler is of course fed by or feeds the associated electronic equipment, via the external cabling and the coupling path in the base of the antenna assembly. A highly advantageous operating characteristic for such a non-symmetrically coupled and swept-back antenna is represented in the FIGURE 8 diagram of its electrical field vectors 32a'–32f', developed in general correspondence with the orientation of edges 32a–32f (FIGURE 6) of the main elements, 21a and 21b. This pattern of electrical field vectors is one which exhibits a substantially continuous curvature, as illustrated, and thus enables the antenna to provide coverage on all sides. Each of the edge sections 32a–32f is of length relatively short in relation to wavelength proportions; lengths selected in practice may be determined empirically, for example, to insure that desired directionality or omnidirectionality is attained within a wide bandwidth. Image impedance limitations, considered in relation to the ground plane 33 created by the aircraft skin, are significantly reduced with the improved antenna. The parasitic element permits the desired wide bandwidths to be realized, consistent with the antenna pattern required; empirical evaluations of various parasite configurations will facilitate their design in conjunction with the main elements with which they are to be used, for example.

The blade fragment appearing in FIGURE 9 is cross-sectioned near the base, horizontally, at the site of the strip-coupler. There, the center lamination 15 is recessed, inwardly from one surface, in the pattern which from the side has the configuration 34 in FIGURE 1. Only the opposite surface bears the conductive coating, 21b, the other coating, 21a', forming the other part of the main antenna element being affixed to the cover lamination 16. Two insulating strips, 35 and 36, one or both of which carries a covering of conductive material 31' to form the strip coupler 31, fill the recess and orient the flat strip coupler substantially midway between and parallel with the main element conductors 21a' and 21b. A pin-type connection with the strip coupler is conveniently made near the lower edge of the blade via a pin opening the locus of which is designated by dashed linework 37.

In other designs based upon the present teachings, the blade laminations may be as few as two, or in excess of the three main laminations shown in connection with the preferred embodiment. For certain purposes, the conductive material forming the main or parasitic antenna elements may be located externally, and the spaced parallel conductors forming these elements may have somewhat different outlines. One or more of such blade antennas may be used in obtaining desired antenna patterns; and the couplings may be modified to suit various needs.

Accordingly, it should be understood that the aforementioned examples, structures and practices have been presented by way of disclosure, rather than limitation, and it should be evident that various modifications, substitutions and combinations may be effected within the purview and on the basis of the present teachings without departing from the spirit and scope of this invetnion as set forth in the appended claims.

What I claim as new and desire to secure by Letters Patent of the United States is:

1. Antenna apparatus comprising at least two substantially flat laminations which are substantially parallel and coextensive over a broad area and each of which is relatively stiff but of thinness permitting flexure under conditions of vibration, at least one of said laminations including electrically conductive material over a broad surface area thereof and having a peripheral configuration defining an antenna element, a damping medium in relatively thin layer form between said laminations, said damping medium including a material which is deformable in response to flexure of and relative slippage between said laminations and which dissipates energy while undergoing deformation, and substantially rigid means mounting the composite assembly of said laminations with said damping medium therebetween substantially along an edge thereof, said mounting means including means for electrically coupling said conductive material of said antenna element with an electrical transmission line.

2. Antenna apparatus as set forth in claim 1 wherein said composite assembly is of substantially triangular peripheral outline, and wherein said mounting means includes a base of electrically conductive material extending substantially transversely to said assembly substantially along one edge thereof in insulated relationship to said antenna element and forming at least part of a ground plane therefor.

3. Antenna apparatus as set forth in claim 1 wherein said laminations of said composite assembly are of electrically-insulating material, and wherein said conductive material is secured to at least one side surface of at least one of said laminations and is of lesser area than and within the periphery of said one of said laminations.

4. Antenna apparatus as set forth in claim 2 wherein said conductive material of said antenna element is continuous and of a swept-back peripheral configuration extending upwardly and rearwardly from a position nearer the apex of said triangular outline, and further including an electrical coupling with said antenna element disposed in a non-symmetrical relationship thereto at substantially said position and electrically coupled with said coupling means of said mounting means.

5. Antenna apparatus as set forth in claim 4 further including a parasitic element of said conductive material substantially coplanar with said antenna element.

6. Antenna apparatus as set forth in claim 5 wherein said laminations of said composite assembly are of electrically-insulating material, and wherein said conductive material of said antenna and parasitic elements comprises thin cladding directly affixed to at least one inside surface of at least one of said laminations in said composite assembly.

7. Antenna apparatus as set forth in claim 5 wherein said damping material comprises a substantially permanently-viscous medium having high molecular cohesiveness and adhesiveness to said laminations which tends to keep said laminations from separating, and wherein said laminations comprise sheets of fiberglass-reinforced resin material.

8. Antenna apparatus as set forth in claim 7 wherein said laminations include a central relatively thick load-supporting lamination and a pair of relatively thin cover-laminations coextensive therewith one on each side thereof, said damping material being disposed between said central lamination and each of said cover laminations substantially coextensively therewith in a relatively thin substantially continuous layer, and wherein said conductive material is disposed inwardly of said cover laminations in said composite assembly.

9. Antenna apparatus as set forth in claim 8 wherein said mounting means further includes a pair of substantially rigid clamp members disposed one on each side of said composite assembly along said one edge, said clamp members being of lesser height from said edge than said laminations, and wherein said damping material further includes layers thereof one between each of said clamp members and said composite assembly.

10. Antenna apparatus as set forth in claim 8 further comprising a series of metallic fasteners extending through said laminations at spaced positions near the periphery of said composite assembly and preventing delamination thereof, said fasteners each being relatively small in relation to the areas of said antenna and parasitic elements.

11. Antenna apparatus as set forth in claim 6 wherein said parasitic element comprises a director and means grounding said director with said base, and wherein the conductive material of said director is disposed forwardly of said position near said apex and in spaced relation to said antenna element.

12. Antenna apparatus as set forth in claim 8 wherein said antenna element comprises substantially identical patterns of said conductive material disposed in spaced parallel relationship one on each side of said central lamination, and wherein said electrical coupling comprises a substantially flat strip of conductive material extending upwardly from said mounting means to said position and between said patterns in substantially parallel spaced relationship therewith.

13. Antenna apparatus as set forth in claim 12 wherein said central lamination has a recess therein from one side thereof accommodating said strip, and wherein said strip comprises a coating of conductive material on a member of insulating material disposed in said recess.

14. Antenna apparatus as set forth in claim 4 wherein said swept-back configuration of said antenna element is generated by a plurality of edge surfaces of said conductive material joined end-to-end and each extending in a different direction relative to the adjoining edges to form a substantially closed continuous loop.

15. Antenna apparatus as set forth in claim 13 wherein each of said substantially identical patterns of said conductive material has said swept-back configuration, said configuration of each of said patterns being developed by a plurality of substantially straight edge surfaces of said conductive material joined end-to-end and each extending in a different direction relative to the adjoining edges to form a substantially closed continuous loop.

References Cited
UNITED STATES PATENTS

| | | | |
|---|---|---|---|
| 3,039,095 | 6/1962 | Josephson | 343—708 |
| 3,384,895 | 5/1968 | Webb | 343—708 |

ELI LIEBERMAN, *Primary Examiner.*

U.S. Cl. X.R.

343—833, 873